June 6, 1950 W. A. BRASTAD ET AL 2,510,923

RECORDING SOUND ON WIRE

Original Filed March 3, 1945

INVENTORS:-
WILLIAM A. BRASTAD
LESTER F. BORCHARDT
BY William C. Babcock
ATTORNEY Patented June 6, 1950 2,510,923

UNITED STATES PATENT OFFICE 2,510,923

RECORDING SOUND ON WIRE

William A. Brastad and Lester F. Borchardt, Minneapolis, Minn., assignors to General Mills, Inc., a corporation of Delaware Original application March 3, 1945, Serial No. 580,820. Divided and this application February 11, 1949, Serial No. 75,758

5 Claims. (Cl. 179—100.2)

This invention relates to recording sound on wire, tape, disks, and like paramagnetic mediums.

This application is a division of our co-pending application filed March 3, 1945, Serial No. 580,820, now U. S. Patent No. 2,483,398, issued Oct. 4, 1949, entitled Recording sound on wire.

Heretofore recordings of sound on wire have been made by transmuting the energy of sound by means of a suitable microphone into an alternating or pulsating current which then acts through a suitable electromagnet to produce a corresponding pulsating magnetic field through which the paramagnetic material, as wire, ribbon, disk, etc., passes to receive a magnetic recording.

By means of this invention the recording can be done without the use of electromagnets or of any paramagnetic material other than that in the wire or other medium on which the record is made. Instead, the recording is done by passing the recording current into and out of said medium.

An object of this invention is to provide a simple and efficient method of and apparatus for recording sound on wire.

Figure 1:
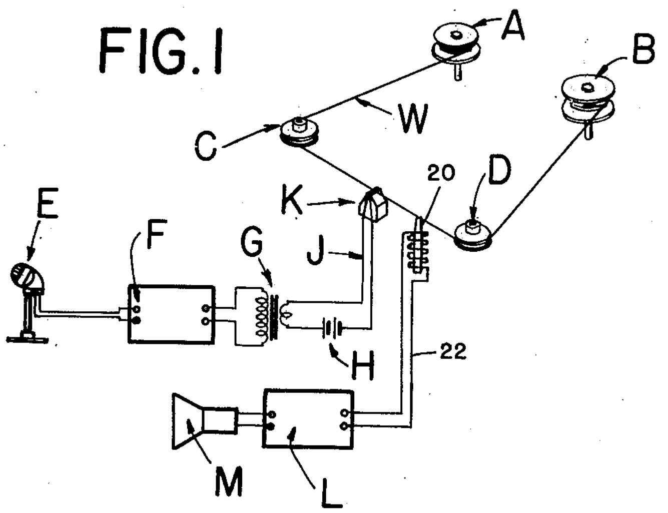
Figure 2:
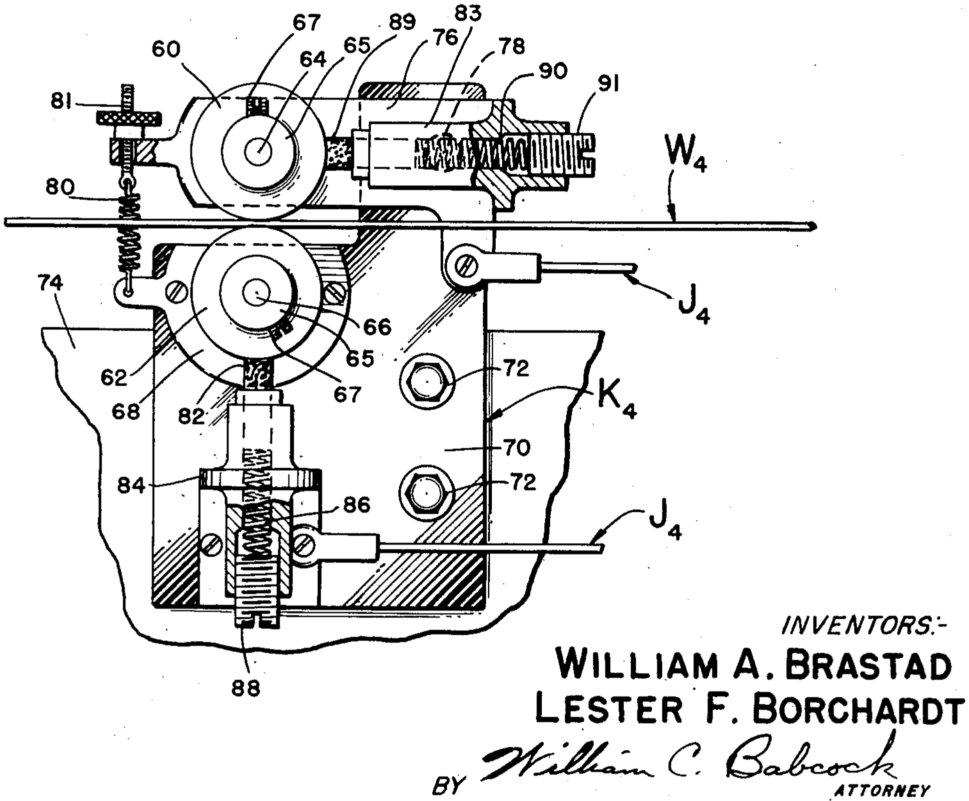

This and other objects as will hereinafter appear, are accomplished by this invention, which is fully described in the present application, and shown in the accompanying drawings in which:

Figure 1 is a diagrammatic view of the apparatus for recording sound on wire and for reproducing the same; and Fig. 2 is a perspective view of a form of recording head for use in this invention.

The embodiment diagrammatically illustrated in Fig. 1 consists of reels A and B with a wire W wound thereon which is unreeled from the reel A, passes around sheaves C, D, and is wound up on the reel B. Apparatus for operating the reels A and B, to reel the wire from reel A to reel B and then from reel B to reel A, is well known in this art and is not illustrated as it forms no part of the present invention.

Sound to be recorded on the wire W acts on the microphone E causing it to generate an electrical voltage which varies in frequency and amplitude corresponding to said sound. The voltage is suitably amplified by the amplifier F terminating in transformer G. The resulting current is then combined with a biasing current from a suitable source such as battery H, and passes through the leads J to the recording head K which causes the current to pass through the recording wire W thereby creating a magnetic sound record on the moving wire. Applicants' theory of how the recording occurs is discussed later in the specification.

The recording head K, shown in Fig. 1, is one of the various forms of heads which may be used in the invention and is fully described in the copending parent application Serial No. 580,820, now U. S. Patent No. 2,483,398, issued Oct 4, 1949.

In the present setup a stepdown transformer is used to lower the voltage and increase the magnitude of current put out by the amplifier F. The stepdown ratio of this transformer, however, is a matter of choice, depending largely on the current and voltage output of the amplifier.

For our purposes we have found that a speed of 5 ft. per second on wire W is suitable both for recording and reproducing. This, however, may be varied considerably.

In the setup, as shown in Fig. 1, with the recording head shown or with the head of Fig. 2, the wire W moves contacting the conductors or electrodes and current enters the wire W through one of the conductors and leaves through the other. Alternations of this current in the output of the amplifier are recorded on the wire W and can be picked up, either at once or later, by a suitable electromagnetic reproducer 20, which in turn generates an alternating current in the leads 22. This current then being amplified in the amplifier L is converted into sound in the loud speaker M.

Applicants' theory of how the recording occurs, but by which they do not wish to be bound, is as follows: A biasing current, preferably of the order of one ampere, is supplied to the leads J by the battery H and on this current is superimposed a pulsating or alternating audio current by the secondary coil of the transformer G. These combined currents flow through electrodes and thence through the steel wire W on which a recording is to be made. Because of the relatively large electric currents and the small cross-sectional area of the current path through the steel wire W, the magnetic fields generated by these electric currents are sufficiently strong to leave a magnetic sound record on the moving wire. It is to be understood applicants are not limited to D. C. biasing but may use any other well known form such as supersonic.

The recording head shown in Fig. 2 has the wire $W_4$ passing between electrodes shown in the form of metal rollers 60, 62 which are suitably journalled on studs 64, 66, respectively, and retained by set collars 65, and set screws 67. The stud 66, is attached to a base 68, which is secured by screws to a block of insulation 70, which in turn is secured by screws 72, to a part of the recorder frame 74. The stud 64 is carried by a member 76 which is hingedly mounted on a pin 78, secured in the block of insulation 70. A spring 80 yieldably forces the roller 60 against the wire $W_4$, thereby gripping the wire between the rollers. The rollers can be powered so as to drive the wire $W_4$ or the wire can be drawn by other means thus causing the rollers to rotate about their axes as idlers. An adjusting screw 81 is an electric insulator to prevent current short circuiting the rollers 60, 62.

Electric current fluctuations to be recorded are made to flow to the rollers 60 and 62 by means of suitable brushes 82 and 89, of carbon or the like, held in tubular lugs 83 and 84, and yieldably pressed against the peripheries of the roller by means of a spring 86, 90, adjustably held by screws 88 and 91.

As the recording is made, the wire W, in Fig. 1, feeds from the reel A over sheaves C, D and past the recording head K to the reel B. The wire can be played by means of the reproducing head immediately after recording or at any later time by running the wire in the same direction. While we have discussed only a recording medium in the form of a wire, it will be realized that this method may be satisfactorily employed with other forms of recording media such as tapes, disks, and cylinder.

While we have shown and described but a few forms of our apparatus, it will be apparent that it is capable of many modifications. Changes, therefore, in the construction and arrangement may be made without departing from the spirit and scope of the invention as defined by the appended claims.

We claim as our invention:

1. Apparatus for recording sound on moving paramagnetic wire comprising electrodes spaced laterally of the wire and in contact therewith, the wire passing between the electrodes, means for developing from sounds to be recorded a varying electrical voltage corresponding to the sounds, and means for applying said electrical voltage to the electrodes thereby causing a varying current to flow through the portion of wire between said points to record the sound magnetically on the wire.

2. Apparatus for recording sound on a paramagnetic wire comprising electrically conducting rollers in contact with the wire, means for moving a wire between said rollers with the rollers in contact with laterally spaced points on the wire, means for developing from sounds to be recorded a varying electrical voltage corresponding to the sounds, and means to apply said electrical voltage to the rollers thereby causing a varying current in the wire between rollers to record the sound magnetically on the wire.

3. Apparatus for recording sound on paramagnetic wire comprising electrically conducting rollers, means for longitudinally moving a wire in contact therewith, means for yieldably pressing said rollers toward the wire, means for developing from sounds to be recorded a varying electrical voltage corresponding to the sounds, and means for applying said electrical voltage to the rollers thereby causing a varying current to flow in the wire between the rollers to record the sound magnetically on the wire.

4. Apparatus for recording sound on paramagnetic wire comprising electrically conducting rollers journalled on studs on opposite sides of the wire, means for moving a wire between said rollers and in contact therewith, means for yieldably pressing said studs toward the wire, means for developing from sounds to be recorded a varying electrical voltage corresponding to the sounds, and means for applying said electrical voltage to the electrodes thereby causing a varying current in the wire between the rollers to record the sound magnetically on the wire.

5. Apparatus for recording sound on paramagnetic wire comprising spaced electrodes consisting of electrically conducting rollers journalled on studs on opposite sides of the wire, means for moving a wire between said rollers and in contact therewith, one of said studs being mounted to swing about an axis, means for yieldably pressing said studs toward each other, means for developing from sounds to be recorded a varying electrical voltage corresponding to the sounds, and brushes bearing on the rollers connected to the means for developing the electrical voltages and applying to the rollers the electrical voltage to cause varying current to flow in the wire between the rollers thereby magnetically recording the sound on the wire.

WILLIAM A. BRASTAD.
LESTER F. BORCHARDT.

No references cited.